United States Patent
Walker et al.

(10) Patent No.: US 9,710,501 B2
(45) Date of Patent: Jul. 18, 2017

(54) ENHANCED PERFORMANCE FOR LARGE VERSIONED DATABASES

(71) Applicant: Kinaxis Inc., Ottawa (CA)

(72) Inventors: Robert N. Walker, Ashton (CA); James R. Crozman, Ottawa (CA); Mosa Yeung, Ottawa (CA); James Gordon Dagg, Almonte (CA)

(73) Assignee: Kinaxis Inc., Ontario (CA)

( * ) Notice: Subject to any disclaimer, the term of this patent is extended or adjusted under 35 U.S.C. 154(b) by 940 days.

(21) Appl. No.: 13/801,471

(22) Filed: Mar. 13, 2013

(65) Prior Publication Data

US 2013/0311422 A1 Nov. 21, 2013

Related U.S. Application Data

(60) Provisional application No. 61/617,960, filed on Mar. 30, 2012.

(51) Int. Cl.
*G06F 17/30* (2006.01)

(52) U.S. Cl.
CPC .. *G06F 17/30306* (2013.01); *G06F 17/30309* (2013.01)

(58) Field of Classification Search
CPC ......... G06F 17/30351; G06F 17/30368; G06F 17/30306; G06F 17/30309; G06F 17/30348; G06F 17/30893; G06F 17/30286; G06F 17/30; G06F 17/30598
USPC ....................... 707/609, 610, 638
See application file for complete search history.

(56) References Cited

U.S. PATENT DOCUMENTS

| | | | | |
|---|---|---|---|---|
| 6,085,296 | A * | 7/2000 | Karkhanis | G06F 12/1009 711/147 |
| 6,230,246 | B1 * | 5/2001 | Lee | G06F 11/1464 711/162 |
| 7,788,243 | B2 * | 8/2010 | Pasupuleti | G06F 17/30551 707/704 |
| 8,681,951 | B1 * | 3/2014 | Lavian | H04M 3/4938 348/14.01 |
| 8,712,970 | B1 * | 4/2014 | Sim-Tang | 707/672 |
| 8,868,506 | B1 * | 10/2014 | Bhargava et al. | 707/648 |
| 2002/0103814 | A1 * | 8/2002 | Duvillier et al. | 707/202 |
| 2003/0033328 | A1 * | 2/2003 | Cha | G06F 17/30351 |
| 2005/0223043 | A1 * | 10/2005 | Randal et al. | 707/200 |

(Continued)

OTHER PUBLICATIONS

International Search Report and Written Opinion issued by the Canadian Intellectual Property Office as International Searching Authority for corresponding International Application No. PCT/IB2013/000932 mailed Sep. 13, 2013 (10 pgs.).

(Continued)

*Primary Examiner* — James Trujillo
*Assistant Examiner* — Fariborz Khoshnoodi
(74) *Attorney, Agent, or Firm* — Wilmer Cutler Pickering Hale and Dorr LLP

(57) ABSTRACT

In accordance with the disclosed subject matter, systems and methods are provided for improving performance of a versioned database. Embodiments include systems and methods for improving performance of versioned databases by selectively loading portions of database files on disk into memory. Embodiments also include systems and methods for capturing and consolidating or condensing transaction logs into database files for loading.

12 Claims, 12 Drawing Sheets

(56) References Cited

U.S. PATENT DOCUMENTS

| | | | | |
|---|---|---|---|---|
| 2007/0061266 A1* | 3/2007 | Moore | ................... | G06Q 50/00 |
| | | | | 705/51 |
| 2008/0046440 A1* | 2/2008 | Estes | ............................ | 707/100 |
| 2010/0076928 A1* | 3/2010 | Luedtke | ............ | G06F 17/30241 |
| | | | | 707/617 |
| 2010/0169288 A1* | 7/2010 | Brown | .......................... | 707/695 |

OTHER PUBLICATIONS

Rao, et al., "HBase-0.20.0 Performance Evaluation," dated Aug. 21, 2009. Downloaded from http://www.slideshare.net/schubertzhang/hbase-0200-performance-evaluation# on Jan. 13, 2014 (7 pgs.).

\* cited by examiner

Part.OnHands set — 502

| Part Id | OnHand Id |
|---|---|
| 1 | 67 — 514 |
| 1 | 330 — 516 |
| 2 | 75 — 518 |
| 5 | 1693 — 520 |
| . | . |
| . | . |

506 → Part Id 1
508 → Part Id 1
510 → Part Id 2
512 → Part Id 5

500

Part.PartSources set — 504

| Part Id | PartSource Id |
|---|---|
| 1 | 818 |
| 2 | 67 |
| 7 | 722 |
| 9 | 654 |
| . | . |
| . | . |

FIG. 5 ning new transactions, the trans-action log tracking a series of commands for updating a versioned database based at least in part on one or more earlier database files. The method further includes creating a new database file with a hive entry point, the new database file configured to be append-only to avoid losing existing versioned database information, the hive entry point representing an entry point for retrieving one or more records in the versioned database. The method further includes appending updated data in the new database file, the updated data determined based at least in part on one or more transactions in the transactions log, and updating the new database file to refer to the one or more earlier database files, based at least in part on the one or more transactions in the transactions log.

ENHANCED PERFORMANCE FOR LARGE VERSIONED DATABASES

CROSS-REFERENCE TO RELATED APPLICATIONS

This application claims benefit under 35 U.S.C. §119(e) of U.S. Provisional Patent Application No. 61/617,960, entitled "High Performance Caching for Large Databases," filed Mar. 30, 2012, which is expressly incorporated by reference herein in its entirety.

FIELD OF THE DISCLOSURE

The present disclosure relates to systems and methods for improving performance of large versioned databases.

BACKGROUND

Databases organize collections of data into records. The records can be organized into sets and/or tables. Databases can be stored on disk, or in memory. An on disk database stores relevant data on stable storage such as hard disks, optical discs, or flash memory. Disk storage allows for cheaper storage and/or more space for storage of relevant data compared to storage in computer memory.

Compared with on disk databases, in memory databases rely primarily on main memory such as Random Access Memory (RAM). Because memory storage can perform faster than disk storage, in memory databases often perform faster than on disk databases, for example because the number of seeks to disk required is lowered.

SUMMARY

In accordance with the disclosed subject matter, systems and methods are provided for improving performance of a versioned database. Embodiments include systems and methods for improving performance of versioned databases by selectively loading portions of database files on disk into memory. Embodiments also include systems and methods for capturing and consolidating or condensing transaction logs into database files for loading.

Certain embodiments include a method of improving performance of a versioned database, including mapping a database file to a contiguous block in the virtual memory, the database file corresponding to one or more records of a versioned database. The method further includes loading regions in the contiguous block in the virtual memory with corresponding content of the records of the versioned database from the database file, and allocating related regions in the contiguous block in the virtual memory as available for loading but empty to store related records from the database file. The method further includes intercepting an access violation exception, the access violation exception resulting from an attempt to read or write data in the versioned database from or to a requested address in the virtual memory, and reading a block of the database file into the requested address in the virtual memory, if the requested address corresponds to an allocated related region of the contiguous block of virtual memory.

Certain embodiments include a system for improving performance of a versioned database. The system includes a virtual memory, a disk, and at least one processor. The at least one processor can be configured to map a database file to a contiguous block in the virtual memory, the database file corresponding to one or more records of a versioned database, and load regions in the contiguous block in the virtual memory with corresponding content of the records of the versioned database from the database file. The at least one processor can be further configured to allocate related regions in the contiguous block in the virtual memory as available for loading but empty to store related records from the database file. The at least one processor can be further configured to intercept an access violation exception, the access violation exception resulting from an attempt to read or write data in the versioned database from or to a requested address in the virtual memory, and read a block of the database file into the requested address in the virtual memory, if the requested address corresponds to an allocated related region of the contiguous block of virtual memory.

Certain embodiments include a method for improving performance of a versioned database, including closing a transaction log from receiving new transactions, the trans-action log tracking a series of commands for updating a versioned database based at least in part on one or more earlier database files. The method further includes creating a new database file with a hive entry point, the new database file configured to be append-only to avoid losing existing versioned database information, the hive entry point representing an entry point for retrieving one or more records in the versioned database. The method further includes appending updated data in the new database file, the updated data determined based at least in part on one or more transactions in the transactions log, and updating the new database file to refer to the one or more earlier database files, based at least in part on the one or more transactions in the transactions log.

Certain embodiments include a system for improving performance of a versioned database. The system can include a virtual memory, a disk, and at least one processor. The at least one processor can be configured to create a new database file with a hive entry point, the new database file configured to be append-only to avoid losing existing versioned database information, the hive entry point representing an entry point for retrieving one or more records in the versioned database. The at least one processor can be further configured to append updated data in the new database file, the updated data determined based at least in part on one or more transactions in the transactions log, and update the new database file to refer to the one or more earlier database files, based at least in part on the one or more transactions in the transactions log.

The embodiments described herein can include additional aspects of the present invention. For example, the reading the block of the database file can include transforming the block of the database file in memory by determining a creation version based at least in part on a disk version id, the disk version id tracking a version of the requested record body, and replacing the disk version id with a pointer to a location in the virtual memory of the requested data. The block of the database file can further include per-record flags, per-link flags, a disk version id, a creation version, or a pointer to a location in the virtual memory of the requested data. The systems and methods can further include, for each node in a tree of nodes stored in the new database file, the tree of nodes representing records in the versioned database, determining whether a current node in the tree of nodes is accessible from a current root of the tree of nodes, and updating a temporary database file based on the current node, if the current node is accessible from the current root of the tree of nodes and not if the current node is inaccessible from the current root of the tree of nodes. The new database file or the one or more earlier database files can store a chain datastore, a table datastore, or a set datastore. The new database file and the one or more earlier database files can store trees of nodes, the trees of nodes representing records in the versioned database, and the appending updated data can further include creating new nodes to refer to new versions of corresponding data in the versioned database, the new nodes created in a tree of nodes corresponding to the new database file. The new database file and the one or more earlier database files can store trees of nodes, the trees of nodes representing records in the versioned database, and the updating the new database file can include modifying nodes in a tree of nodes corresponding to the new database file to refer back to the one or more earlier database files, if transactions tracked in the transaction logs do not modify records in a corresponding datastore of the tree of nodes. The systems and methods can further include storing the transaction log, the new database file, and the one or more earlier database files on a live system, the live system servicing requests for database operations, determining whether to copy at least one of the transaction log, the new database file, and the one or more earlier database files to a remote system, based at least in part on whether there is a new database file on the live system, if there is a new database file on the live system, determining whether there is a new initial database file on the live system, if there is a new initial database file on the live system, copying the new initial database file to a remote system, and deleting the one or more earlier database files and earlier transaction logs on the remote system, otherwise, copying new database files in sequence to the remote system, and deleting earlier transaction logs on the remote system, otherwise, determining whether there is a completed transaction log on the live system; and if there is a completed transaction log on the live system, copying the new completed transaction log to the remote system. The tree can be a B+ tree or a B tree.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

FIG. 5 is a block diagram of an example of set storage of large databases in accordance with certain embodiments of the present disclosure.

DETAILED DESCRIPTION

The present disclosure describes systems and methods for improving performance of large versioned databases by selectively loading portions of database files on disk into memory. Accordingly, compared with a database architecture in which the entire versioned database is loaded into memory, the present systems and methods permit use of a large versioned database having a size which greatly exceeds available memory, and which still approaches the overall performance of the all-in-memory architecture. Using the present systems and methods, input data from a database is loaded from disk into memory only as required. This targeted loading is done via a demand-loading technique using access violation exceptions and assignment of contiguous virtual memory locations to the database content as stored in disk files.

In the situation where input data needs to be removed from memory to accommodate other uses of the memory, such as a query or analytics cache, the use of exception-based loading means that any input data can be removed. One simple and effective technique for making this choice of which input data to remove from memory is to prioritize input data for removal according to virtual memory address, based on addresses neighboring the previous address that was removed.

The present system allows requested data to be located quickly in on-disk files for loading into memory, using specialized B+ trees which permit quick identification of required set data, and which permit quick access to that data on disk. Changes to data are initially logged to disk as transactions in transaction logs. A later capture operation incorporates the transactions into a navigable B+ tree database.

Figure 1:
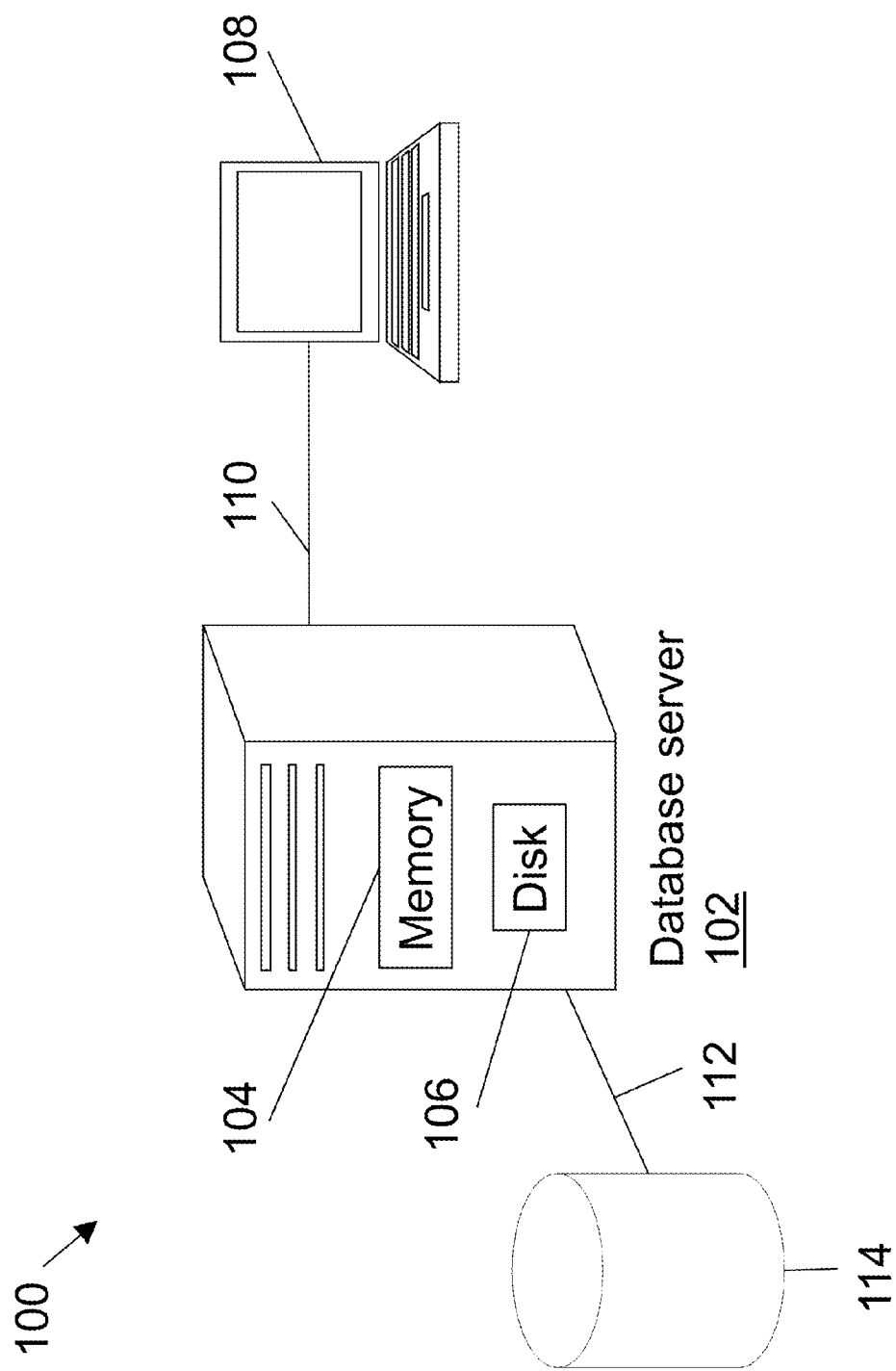
FIG. 1 illustrates a non-limiting example of a system for caching of large databases in accordance with certain embodiments of the present disclosure.

Turning to the figures, FIG. 1 illustrates a non-limiting example of a system 100 for caching of large databases in accordance with certain embodiments of the present disclosure. System 100 includes a database server 102, a large versioned database 114, and a client 108. Database server 102 includes a memory 104 and a disk 106. In some embodiments, memory 104 can be volatile memory, compared with disk 106 which can be non-volatile memory. In some embodiments, database server 102 can communicate with a versioned database 114 using interface 112. A versioned database refers to a database which efficiently provides numerous complete delta-based copies of an entire database. Each complete database copy represents a version.

Versioned databases can be used for numerous purposes, including simulation and collaborative decision-making.

Of course, system 100 may also include additional features and/or functionality. For example, system 100 may also include additional storage (removable and/or non-removable) including, but not limited to, magnetic or optical disks or tape. Such additional storage is illustrated in FIG. 1 by memory 104 and disk 106. Storage media includes volatile and nonvolatile, removable and non-removable media implemented in any method or technology for storage of information such as computer-readable instructions, data structures, program modules or other data. Memory 104 and disk 106 are examples of non-transitory computer-readable storage media. Non-transitory computer-readable storage media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media may be part of system 100.

System 100 may also include interfaces 110, 112. Interfaces 110, 112 may allow components of system 100 to communicate with each other and with other devices. For example, database server 102 can communicate with client 108 and database 114 using interfaces 110, 112. Non-limiting example interfaces 110, 112 can include wired media such as a wired network or direct-wired connection, and wireless media such as acoustic, radio frequency (RF), infrared and/or other wireless media. Interfaces 110, 112 may allow database server 102 to communicate with client 108 and database 114 over various networks types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 110, 112 connect may run a plurality of network protocols including, but not limited to, Transmission Control Protocol (TCP), Internet Protocol (IP), realtime transport protocol (RTP), realtime transport control protocol (RTCP), file transfer protocol (FTP), and hypertext transfer protocol (HTTP).

Figure 2:
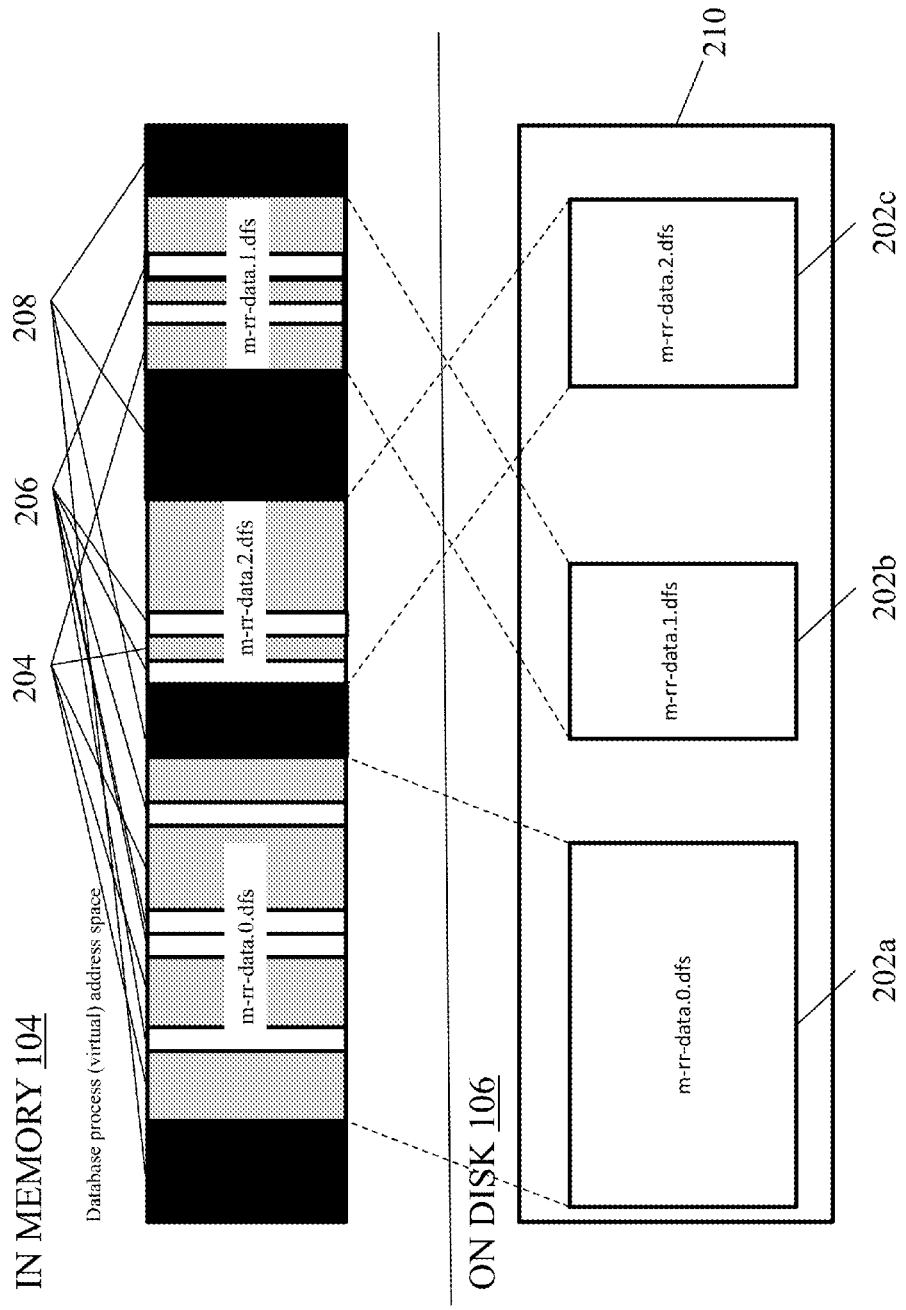
FIG. 2 is a block diagram of an example of demand loading of large databases in accordance with certain embodiments of the present disclosure.

FIG. 2 is a block diagram of an example of demand loading of large databases in accordance with certain embodiments of the present disclosure. As illustrated in FIG. 2, the versioned database in the present system includes a set of one or more database files 202a-c, which together form a complete database hive 210. As used herein, a "hive" refers to a single data structure that contains the complete current state of the versioned database, aggregated over time. In some embodiments, each database file is named with a sequence number and a suffix of ".dfs." To improve caching performance for the present system, each such database file is allocated a contiguous region in virtual memory 104 for the server process.

Database files 202a-c provide certain advantages for caching large databases. As used herein, a "database file" refers to a file which stores a portion or fragment of the versioned database, for a given point in time. That is, database file m-rr-data.0.dfs 202a represents a "Generation 0" database file which contains a complete database, as of the time it was created. Database file m-rr-data.1.dfs 202b acts as an overlay of part of database file m-rr-data.0.dfs 202a, which incorporates transactions of a certain interval in time after database file m-rr-data.0.dfs 202a was created. Accordingly, the transactions stored in database file m-rr-data.1.dfs 202b represent new versions of relevant changed data stored in the versioned database, without the need to store a complete copy of the database. Similarly, database file m-rr-data.2.dfs 202c acts as a second overlay, which incorporates transactions of a subsequent interval in time after database file m-rr-data.1.dfs 202b was created. Hive 210 represents a combination of these three database files into a single large data structure that contains the complete current state of the database, as of the time that database file m-rr-data.2.dfs 202c was created.

Memory 104 illustrates a result of loading portions of a large versioned database from database files on disk, into memory as needed. As described earlier, advantageously each database file is mapped to a contiguous block of virtual memory. As an example of demand loading, data is loaded into memory based on need. Each region 206 (i.e., all areas illustrated in white in memory 104) is loaded with content from a corresponding region of the corresponding database file. Each region 204 (i.e., all areas illustrated in grey in memory 104) includes areas of memory which are available for loading but not currently loaded. That is, each region 204 is currently empty, but may eventually be used only to store content from the corresponding region of the corresponding database file, as described later. Each region 208 (i.e., all those areas illustrated in black in memory 104) is not reserved for use by content from the DFS database file.

Database file content is dynamically loaded into memory 104 using an exception handler in response to access violations. In some embodiments, the exception handler can be a vectored exception handler. Of course, other exception handlers can be used as well, such as different types of structured exception handlers. In particular, when data from a given part of a database file is needed, the virtual memory address that is mapped to that part of the database file is simply attempted to be read using a read operation, with no specialized implementation or knowledge needed on the part of the requester. If the requested part of the database file is not yet in memory (i.e. is a grey region 204 in memory 104), then an access violation exception naturally occurs in the operating system. The exception handler in the server checks the address of the exception. If the address is inside one of the grey regions 204 in memory 104, then the exception handler can read a block of the database file on disk 106 into the same offset in the mapped region of memory 104. The present system improves performance for versioned databases by making the requested part of the database file available to the requester with minimal added delay.

Figure 3:
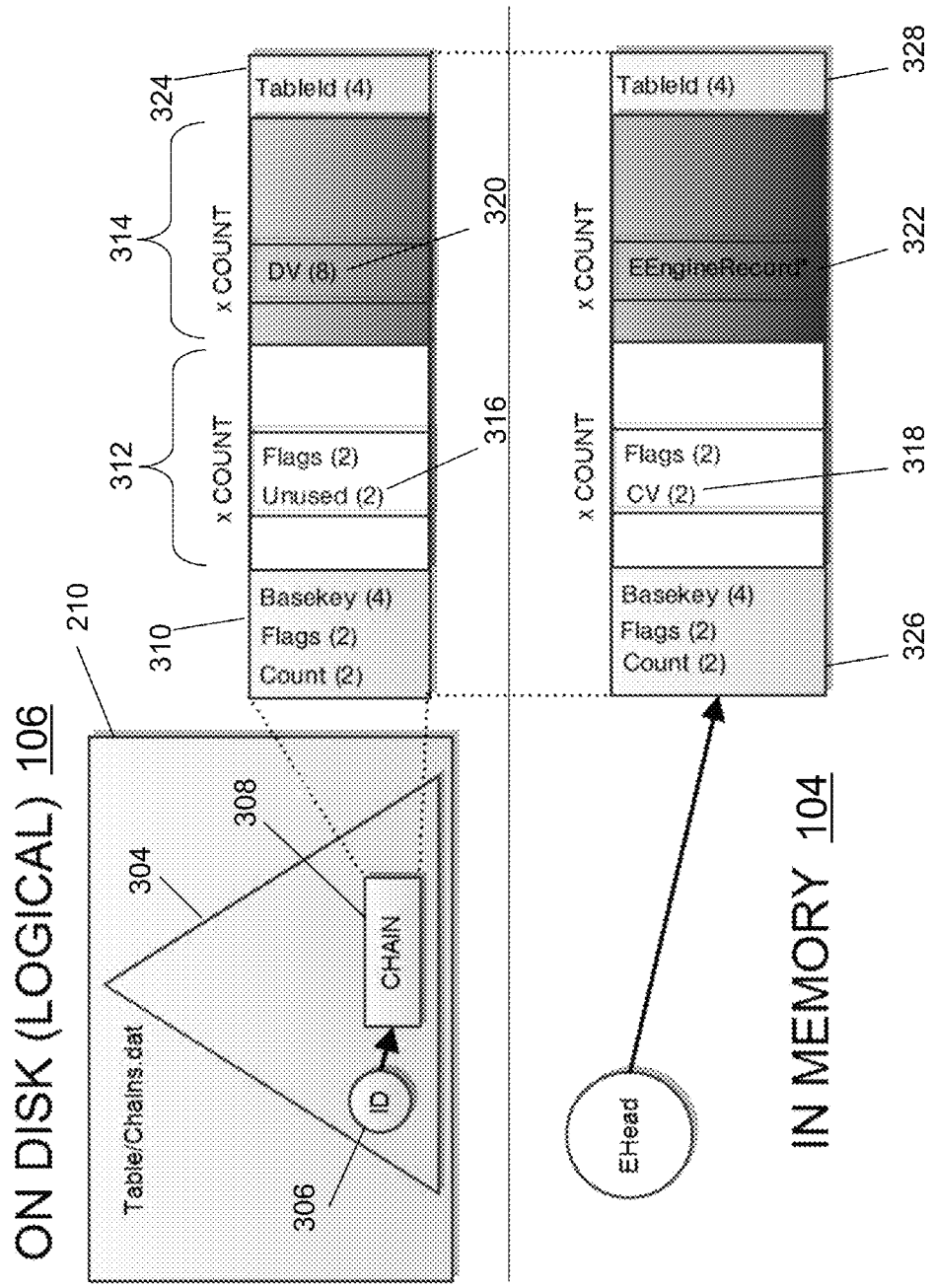
FIG. 3 is a block diagram of a detailed example of demand loading of large databases in accordance with certain embodiments of the present disclosure.

FIG. 3 is a block diagram of a detailed example of demand loading of large databases in accordance with certain embodiments of the present disclosure. As illustrated in FIG. 3, the complete versioned database includes a hive 210 of database files on disk 106. Hive 210 can contain a number of B+ tree datastores, such as B+ tree 304. The B+ tree datastores can store chain objects 308, indexed by record-ID 306. As used herein, a "chain object" refers to the combination of areas 310, 312, 314, 324. Areas 310, 312, 314 represent actual versioning information for a particular record in a particular table, in this instance referenced by table id 324 of the database. When loaded into memory 104, certain fields of the chain object can be selectively overlaid or modified, based on the content of the chain object and based on other server state.

Chain object 308 can include a header 310, regions 312 and 314, and a table id 324. Header 310 can include a count of chain-links in regions 312 and 314, as well as per-record Flags and a reference to a BaseKey string value, if applicable in the current table. Per-record flags can be used to track attributes that exist per-record, such as "auto created." Region 312 contains one or more chain-links containing Flags and an Unused area 316. A "chain-link" refers to a combination of one segment from area 312 and one segment from area 314, which together represent versioning metadata for a single version of a database record with a given record-Id 306. Example per-link flags can be used to track attributes that exist per chain-link, such as "is a deletion node." Unused area 316 is meaningless on disk 106, as it is merely a placeholder, but is used in memory 104. The Count value in header 310 tracks the total number of such chain-links. Region 314 contains one or more chain-links containing a Disk Version (DV) number. The Disk Version number tracks the appropriate version number, for use in tracking separate versions for a versioned database. Again, the total number of chain-links is given by the Count value in header 310.

When loaded into memory 104, the present system improves performance of large databases by performing an overlay transformation to make the in-memory chain useful for high-speed navigation of versioned data records. In particular, the unused field 316 can be overlaid with the appropriate in-memory Creation Version field 318, which is derived from DV 320. Creation Version differs from Disk Version as it is a mapped value, in order to be a version number that is small enough (e.g., in some embodiments, under eight kilobytes). The Creation Version can improve performance of a versioned database because the Creation Version tracks quickly the visibility of the current chain-link in a versioned query. Accordingly, the Creation Version is mapped from the Disk Version so that the Creation Version is small to be used as an index into a bit-array. The Nth bit in this bit-array indicates whether record-versions created with mapped Creation Version N are visible in the plan represented by that bit-array.

DV field 320 is overlaid with a pointer to the actual memory location for the record body on that version. In some embodiments, the pointer is referred to as EEngineRecord pointer 322. Overlaying Disk Version field 320 with the pointer to the actual memory location for the record body improves performance by providing fast access to the record body by pre-loading the pointer once the present system determines that the information is likely to be requested. The present system is able to determine that the information is likely to be requested because it has received a related read request which prompted the present system to load the information into memory 104.

Both Creation Version 318 and EEngineRecord pointer 322 are simple overlays of the on-disk representation. The present system improves performance as follows. Consider the case where the large block of virtual memory of which this chain is a part needs to be released from physical memory. For example, releasing the physical memory allows the physical memory to be used for other operations. As a result, the virtual memory will simply be freed. The next attempt to access this virtual memory will cause an access violation. In response to the access violation, the present system reads in the corresponding region of the associated database file to the same virtual address. As a result, the present system uses the technique described earlier to map the database file. Advantageously, the requesting software that caused the access violation has no awareness that this access violation has occurred, and suffers no impact (other than potential delay) from the temporary absence of this data from physical memory.

Figure 4:
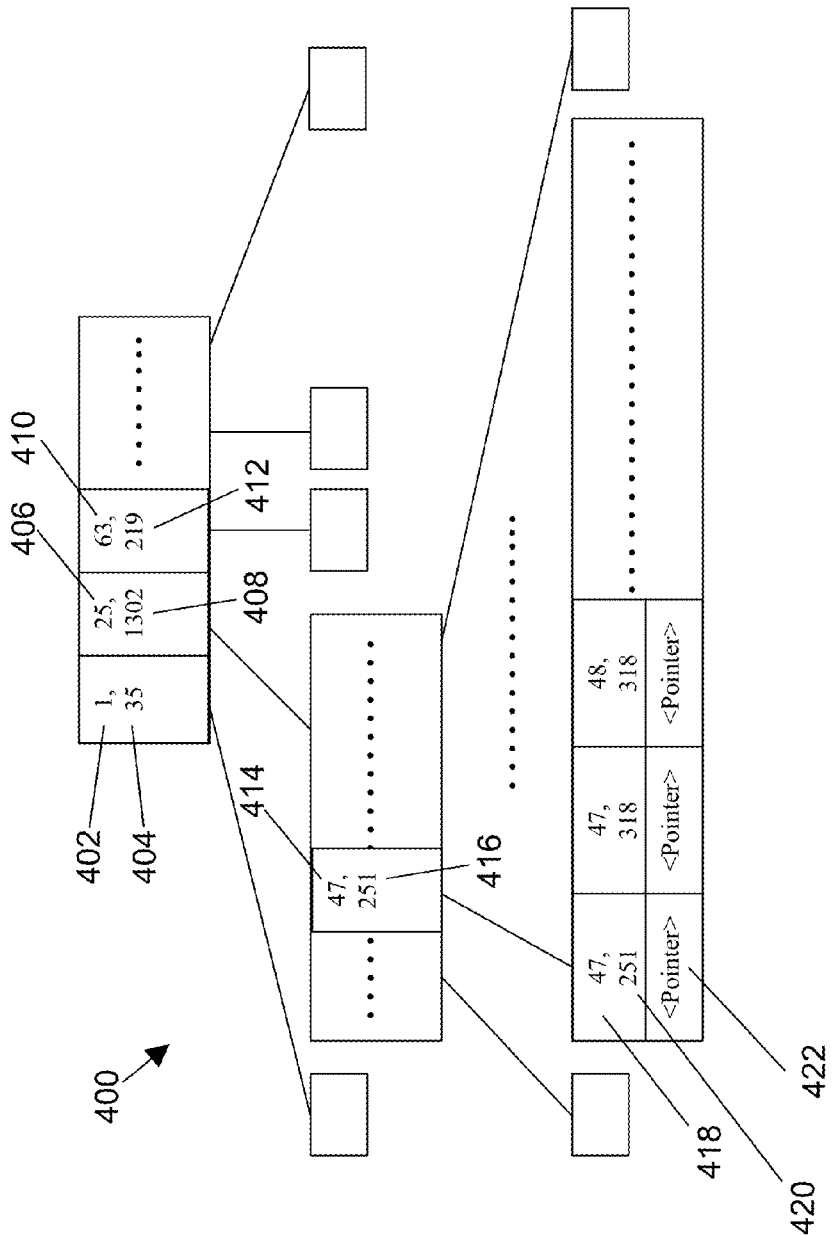
FIG. 4 is a block diagram of an example of tree-based storage of large databases in accordance with certain embodiments of the present disclosure.

FIG. 4 is a block diagram of an example of tree-based storage 400 of large databases in accordance with certain embodiments of the present disclosure. In some embodiments, the versioned database can use B+ trees for storage. B+ trees are used in databases and file systems, to give fast access to large numbers of contiguous versioned records, as used in the present system. B+ trees can be used both on disk and in memory. On disk, B+ trees can be used for every datastore in every hive 210 (shown in FIG. 2). This includes Chain datastores 304 (shown in FIG. 3), as well as Table datastores which contain record bodies indexed by ID and Disk Version as in FIG. 4, and datastores which contain sets (shown in FIG. 5). As described in connection with FIG. 2, since database files are loaded directly into virtual memory, the B+ trees described herein can be also used in memory.

FIG. 4 shows an example of a B+ tree populated to access versioned records of a particular table in a versioned database. Two key values used in database lookups are an ID 306 and a Disk Version 320 (shown in FIG. 3). Examples of an ID include the first number illustrated in a B+ tree node, including IDs 402, 406, 410, 414 and 418. Examples of a Disk Version include the second number illustrated in the B+ tree node, including Disk Versions 404, 408, 412, 416, and 420. In B+ trees, the payload is present only in leaf nodes. In the present system, the payload is illustrated by <Pointer> 422, which addresses another location in the DFS file that contains this tree. The addressed location contains the actual record body contents.

FIG. 5 is a block diagram of an example of set storage 500 of large databases in accordance with certain embodiments of the present disclosure. Sets are used in the versioned database as a key mechanism, to determine which data is chosen for loading into memory. This is because database queries that run against the large database are executed on sets, and most data traversal is by sets. Though FIG. 5 illustrates the data as a table of pairs for simplicity, in fact the data is represented on disk as a B+ tree sorted by both values (i.e., sorted by left value and then by right value). Part.OnHands set 502 and Part.PartSources set 504 illustrate datastores to enumerate set contents for the specific tables OnHand and PartSource, organized by owning Part. In the Part.Onhands 502 example, record IDs 506, 508, 510 and 512 represent record IDs for Part records. Record IDs 514, 516, 518, 520 represent record IDs for OnHand records which belong to the corresponding Part record.

As an example of usage, consider a query on a particular version V, requesting OnHand records for a particular Part. The RecordId for the Part (not shown) is retrieved from a datastore that provides a key-to-id lookup for the Part table, to retrieve the RecordId corresponding to a given internal key. The RecordId is used in the datastore for Part.OnHands set 502 to locate Ids of its OnHand records. Blocks of data from the datastore are loaded into physical memory by traversing the tree until a later Part Id is encountered. The located OnHand Ids for the requested Part are then used in the OnHands/Chains.dat datastore 304, to retrieve Chains 308 for those OnHand records (shown in FIG. 3). The OnHands root set (shown in FIG. 4) is then processed by traversing the tree to retrieve the record bodies.

Figure 6:
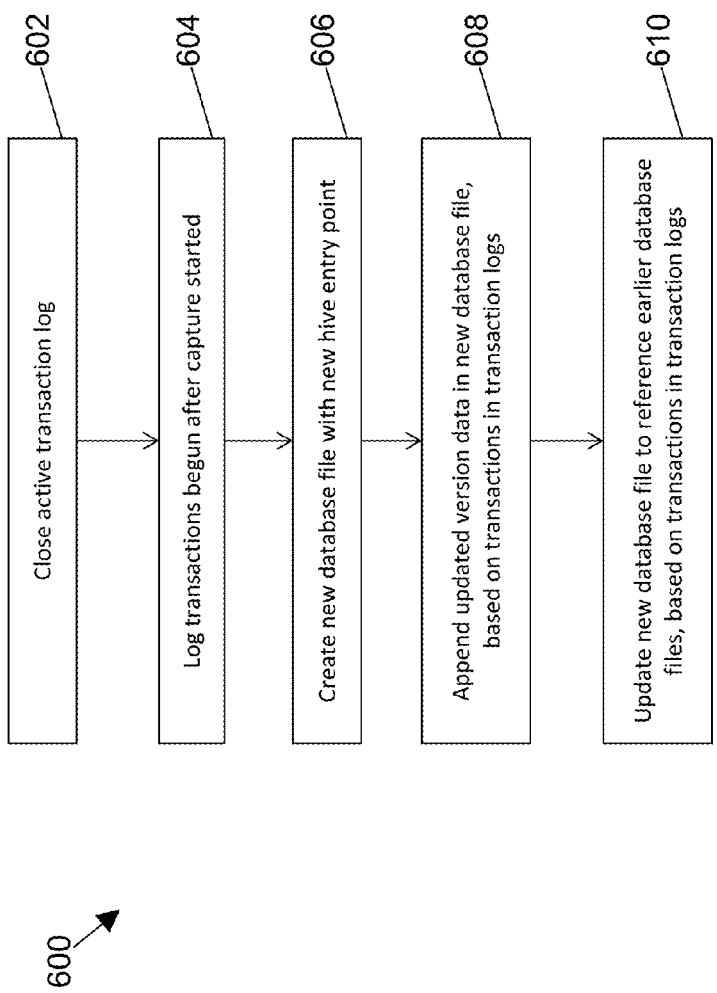
FIG. 6 illustrates an example of a method that the system performs for a capture operation for large databases in accordance with certain embodiments of the present disclosure.

FIG. 6 illustrates an example of a method 600 that the system performs for a capture operation for large databases in accordance with certain embodiments of the present disclosure. Generally, the capture operation described herein converts a temporary transaction log (sometimes referred to herein as an xact log or active file) into a permanent database file (referred to as a DFS file). The transaction log tracks a series of transactions. The transactions can be visualized as commands. For example, one transaction or command may be "modify the description of Part ID 10 to 'thing' on version 2345." In contrast, a database file represents a navigable set of tree data, which is the physical representation of part of a structured versioned database. The capture operation improves performance as follows. Advantages of the capture operation are that the present system applies all transactions to the database on disk, without requiring any performance-sapping locks that would otherwise delay read or write operations on the in-memory database server.

The present system first closes the current active transaction log (step 602). Closing the current active transaction log helps ensure that transactions are not being received for processing into a transaction log by the present system at the same time that the present system is converting that transaction log into a database file. In some embodiments, the present system can close and rename the current active transaction log, for example from active transaction log xact.<ts>.log.active to closed transaction log xact.<ts>.log. As used herein, "<ts>" or similar abbreviations (e.g., ts0, ts1, ts2, ts3, ts4) refer to a timestamp. That is, in some embodiments the present system saves the transaction log with a filename based on the current timestamp. In some embodiments, the present system has an active transaction log (i.e., one xact file with an .active suffix), which the capture operation ignores when processing closed transaction logs. The capture operation processes only transaction log files that have been closed. For example, the capture operation processes only xact.<ts>.log files without an .active suffix. Accordingly, closing and renaming the current active transaction log from xact.<ts>.log.active file to a closed transaction log xact.<ts>.log permits the present system to process all transactions that have completed to the point at which the capture operation began. The present system further logs transactions begun after the capture operation started (step 604). For example, the present system can create a new active transaction log xact.<ts>.log.active file to log new transactions completed after the capture operation began.

The present system creates a new database file with a new hive entry point (step 606). In some embodiments, the present system can create a new root node in a new B+ tree to serve as an entry point into the hive, once the current database file is completed. The present system stores updated data in the new database file and updates the new database file to reference earlier database files (step 608). In some embodiments, the present system stores updated data by creating tree nodes in the new database file to represent new versions of certain records in tables of a versioned database. For example, if the updated data represents a new version of a record, the present system can create a new tree node in the relevant B+ tree. More specifically, for any datastore that is changed or updated by transactions in corresponding transaction logs, the present system creates a new root in a new datastore. The present system then modifies the hive root so that the hive root refers or points to the new root in the new datastore. Creation of new tree nodes is further described later in connection with FIG. 8. The present system also updates the new database file to reference earlier database files (step 610). For example, the present system updates the new database file to reference earlier database files by modifying certain B+ tree node references to refer back to earlier database files, based on the transactions tracked in all closed transaction logs. If the transactions tracked in all closed transaction logs do not modify certain records of a table in a versioned database, the present system can modify the new B+ tree in the new database file to refer to a tree node in an earlier database file. For example, for any datastore that is unchanged by transactions in corresponding transaction logs, the present system modifies the hive root so that the hive root points to a datastore in an earlier database file.

Figure 7:
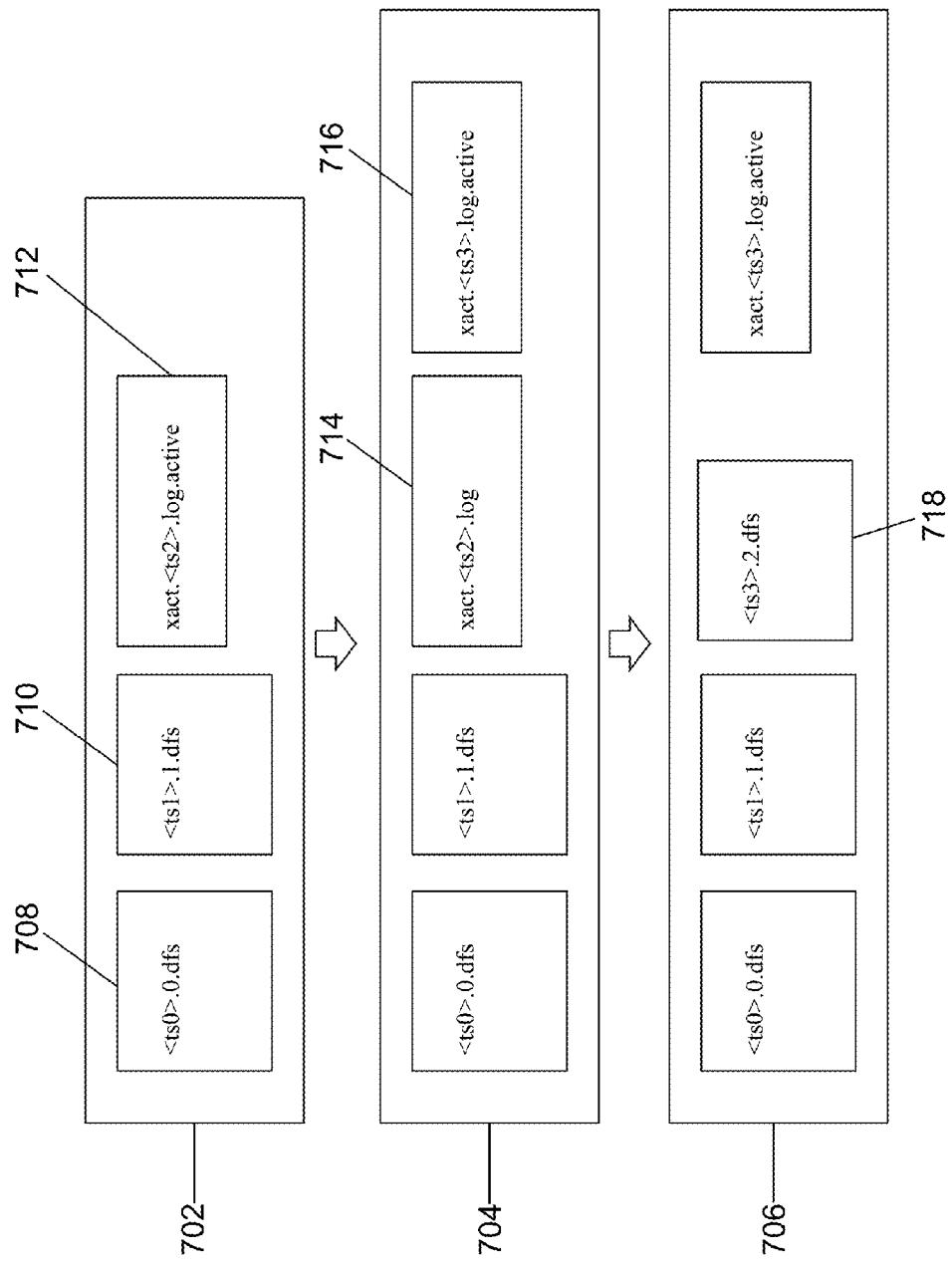
FIG. 7 is a block diagram of an example of the performance of a capture operation to stage transaction logs and incorporate transactions into a new database file that supports versioned data in accordance with certain embodiments of the present disclosure.

FIG. 7 is a block diagram of an example of the performance of a capture operation to stage transaction logs and incorporate transactions into a new database file that supports versioned data in accordance with certain embodiments of the present disclosure. The present system performs this staging disk-to-disk, without needing to slow performance by referencing the in-memory database. As described earlier, an advantage of avoiding referencing the in-memory database is that there is no need to lock the database, which would otherwise lower performance by delaying create, read, update, and/or delete requests. The new database file is additive to the current set, and is itself committed atomically by a single file-rename operation.

As described in connection with FIG. 6, the capture operation involves closing the active transaction log and logging transactions begun after the capture operation has started. For example, the present system can close and rename the current active transaction log, and create a new active transaction log for further logging. FIG. 7 illustrates stage 702 which represents an initial configuration, and stage 704. As illustrated in stage 704, the present system closes the current active transaction log xact.<ts2>.log.active 712 from stage 702, renames the current active transaction log to xact.<ts2>.log 714 by removing the ".active" suffix, and creates a new active transaction log xact.<ts3>.log.active 716. The present system then processes the transactions in the existing closed transaction logs xact.<ts>.log and creates a new database file with a new hive entry point. For example, after the capture operation finishes and the resulting new database file is completed, the present system can give the new database file a DFS suffix, and delete the corresponding closed transaction log. In stage 706, closed transaction log xact.<ts2>.log 714 from stage 704 is renamed to have a DFS suffix as <ts3>.2.dfs 718, and transaction file xact.<ts2>.log 714 is deleted.

The capture operation improves performance by operating only on the on-disk versions of the versioned database, without having to lock an in-memory version as the in-memory version is being used. For example, the present system was able to perform the capture operation based only on the following on-disk files: active transaction log xact.<ts2>.log.active 712, closed transaction log xact.<ts2>.log 714 and active transaction log xact.<ts3>.log.active 716, and database file <ts3>.2.dfs 718. Because these transaction logs and database files are stored on disk, the present system did not have to modify the running versioned database in memory. Furthermore, the present system improved performance by avoiding having to modify any existing on-disk database file.

Figure 8:
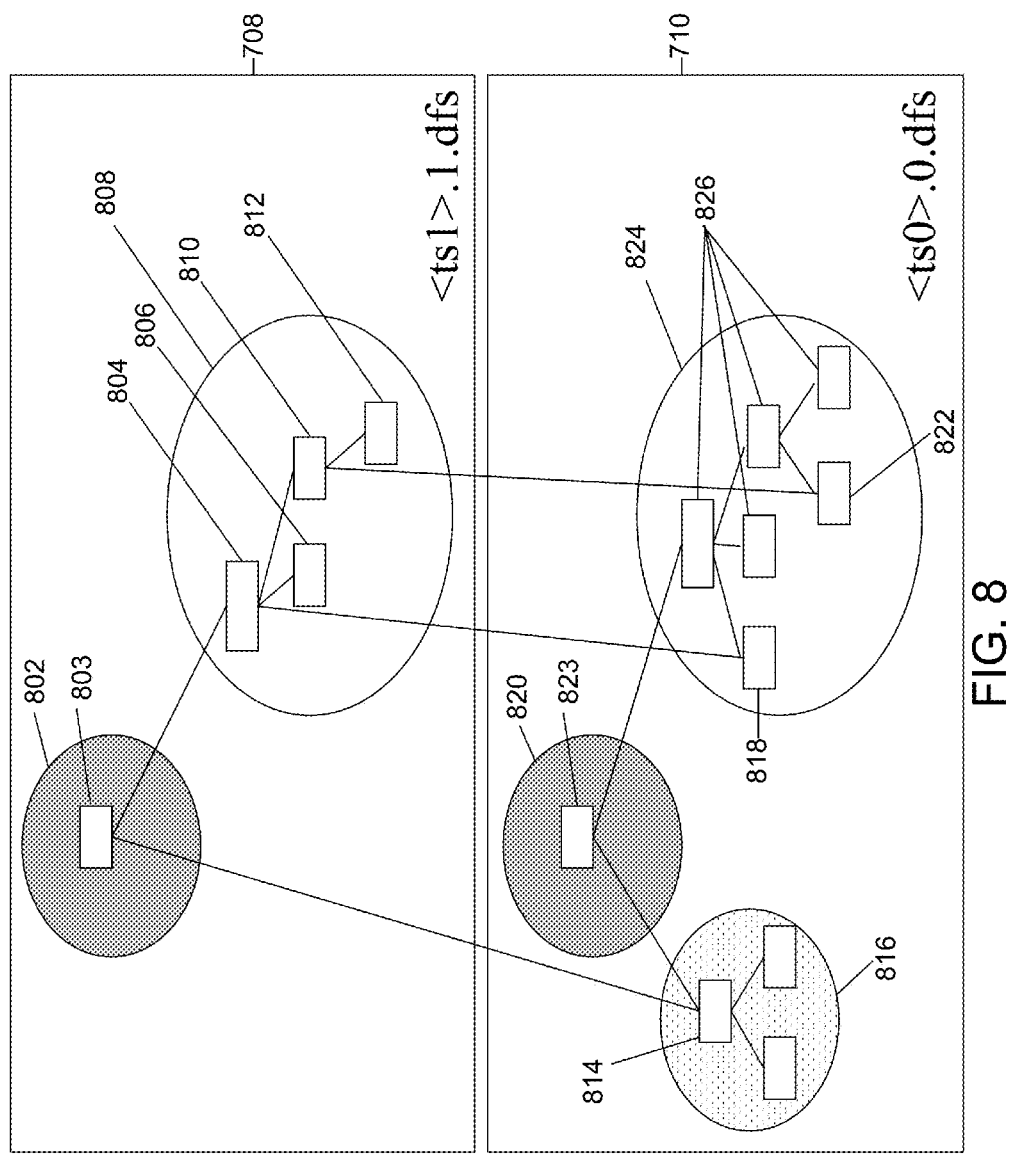
FIG. 8 is a block diagram of an example of a state of tree-based storage for large databases in accordance with certain embodiments of the present disclosure.

FIG. 8 is a block diagram of an example of a state of tree-based storage for large databases in accordance with certain embodiments of the present disclosure. The versioned database supports insert, modify, and delete operations to update content and versioning, without having to modify any existing database file. Database files <ts0>.0.dfs 710 and <ts1>.1.dfs 708 contain multiple B+ tree datastores which constitute an entire versioned database. As used herein, a datastore refers to a logical file, containing data of a particular kind. For example, many datastores consist of a single B+ tree with one or more keys, and zero or more data elements. The datastores are illustrated by ovals, and referenced as datastores 802, 808, 816, 820, and 824.

At an earlier point in time (prior to timestamp <ts1>), only generation 0 database file <ts0>.0.dfs 710 existed. The versioned database was rooted at node 823 in datastore 820, and included datastores 816 and 824 as shown. The creation of database file 708 has changed the overall database content on disk, by providing new root 803 in datastore 802, which makes obsolete old root 823 in datastore 820. In general, for any datastore that is changed or updated by transactions in transaction logs affected by the capture operation, a new root in a new datastore is created and referred or pointed to by the hive root. For example, if datastore 824 is changed by the transactions affected by the capture operation, the present system creates new root 804 in datastore 808, and modifies hive root 803 to refer or point to new root 804. As described earlier, old root 823 becomes obsolete. For any datastore that is unchanged by the transactions affected by the capture operation, the new hive root points to the root node of the datastore in the earlier database file. For example, if datastore 816 is unchanged by the transactions affected by the capture operation, new hive root 803 points to root node 814 of datastore 816, in earlier database file 710.

Newly-created datastore 808 includes the minimum number of new nodes 806, 810, 812 to store the changed data. Where nodes of pre-existing datastore 824 can be re-used, they are pointed to by nodes in the new tree in datastore 808. Examples of these nodes in a pre-existing datastore are nodes 818 and 822, which are linked into the new datastore, by pointers in nodes 804 and 810.

Figure 9:
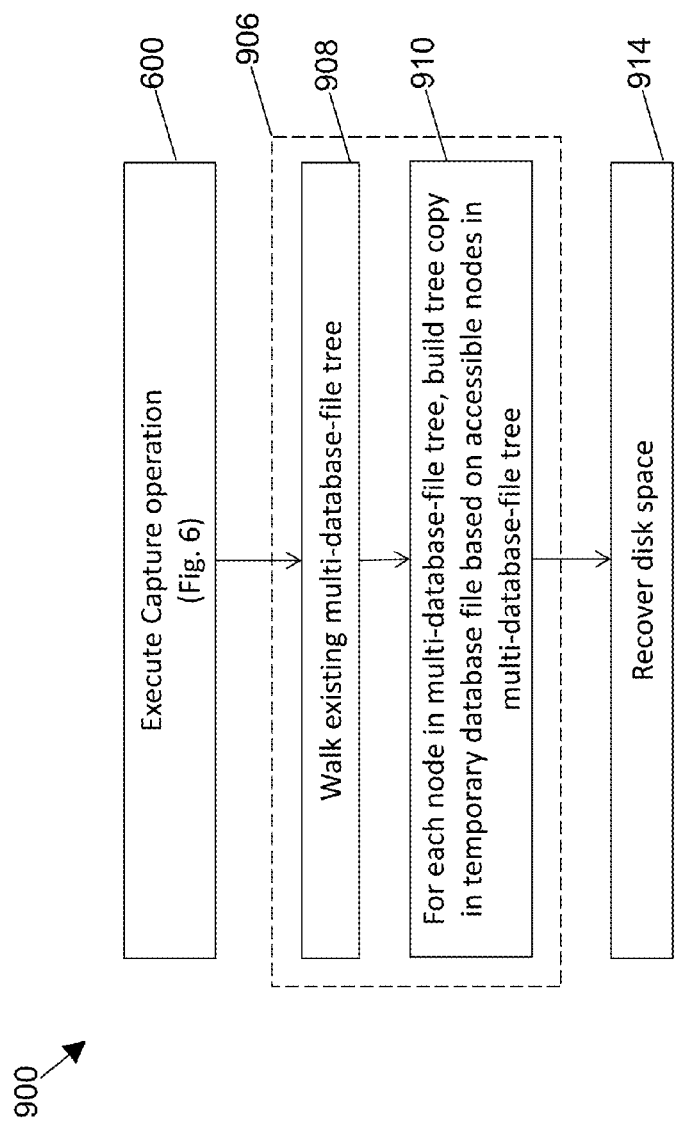
FIG. 9 illustrates an example of a method that the system performs for a condense operation for large databases in accordance with certain embodiments of the present disclosure.

FIG. 9 illustrates an example of a method 900 that the system performs for a condense operation for large databases in accordance with certain embodiments of the present disclosure. Generally, the condense operation described herein consolidates an existing hive spanning multiple database files into a single database file. Advantages of the condense operation include improved performance for versioned databases via a large reduction in disk space usage, and faster data-traversal for subsequent data-loading operations.

The present system begins the condense operation method 900 by executing a capture operation (step 600). As described earlier, the capture operation converts any closed temporary transaction logs on disk into permanent database files on disk. The capture operation is described in more detail earlier, in connection with FIG. 6. As illustrated in box 906, the present system then walks the existing multi-database-file datastore tree (step 908) to gather the current content of that datastore. For example, the present system can walk the datastore tree by proceeding breadth-first to process every node of the tree, by proceeding depth-first to process every node of the tree, or using a combination of breadth-first and depth-first processing. An example of a multi-database-file tree is described earlier in connection with FIG. 8. For each tree node in the multi-database file datastore tree, the present system builds up a copy of the tree in a temporary database file, using only the current content accessible from the new hive root, as a new datastore in the new database file (step 910). For example, the present system can create a temporary file as a new, Generation 0 database file having a .tmp suffix, signaling that the file is not complete. As the present system walks the existing multi-database-file tree, it determines nodes that are accessible from the latest root of the current datastore, and copies only those nodes. For example, with reference to FIG. 8, the condense operation will not copy any nodes 826, because nodes 826 are inaccessible from the latest hive root 803 of the current datastore 708. The present system copies the nodes accessible from the latest root of the current datastore into a new datastore in the temporary database file. Once the temporary database file is complete, the present system can then make the temporary database file active. Making the temporary database file active effectively makes existing database files obsolete. For example, the present system can make the temporary database file active by removing the .tmp suffix from the temporary database file. Lastly, the present system recovers disk space (step 914). For example, because existing database files are obsolete, the present system can delete any existing database files. The result of the condense operation is that the multi-database-file hive represented in pre-existing database files has been consolidated into a new compact representation, in a single database file.

Figure 10:
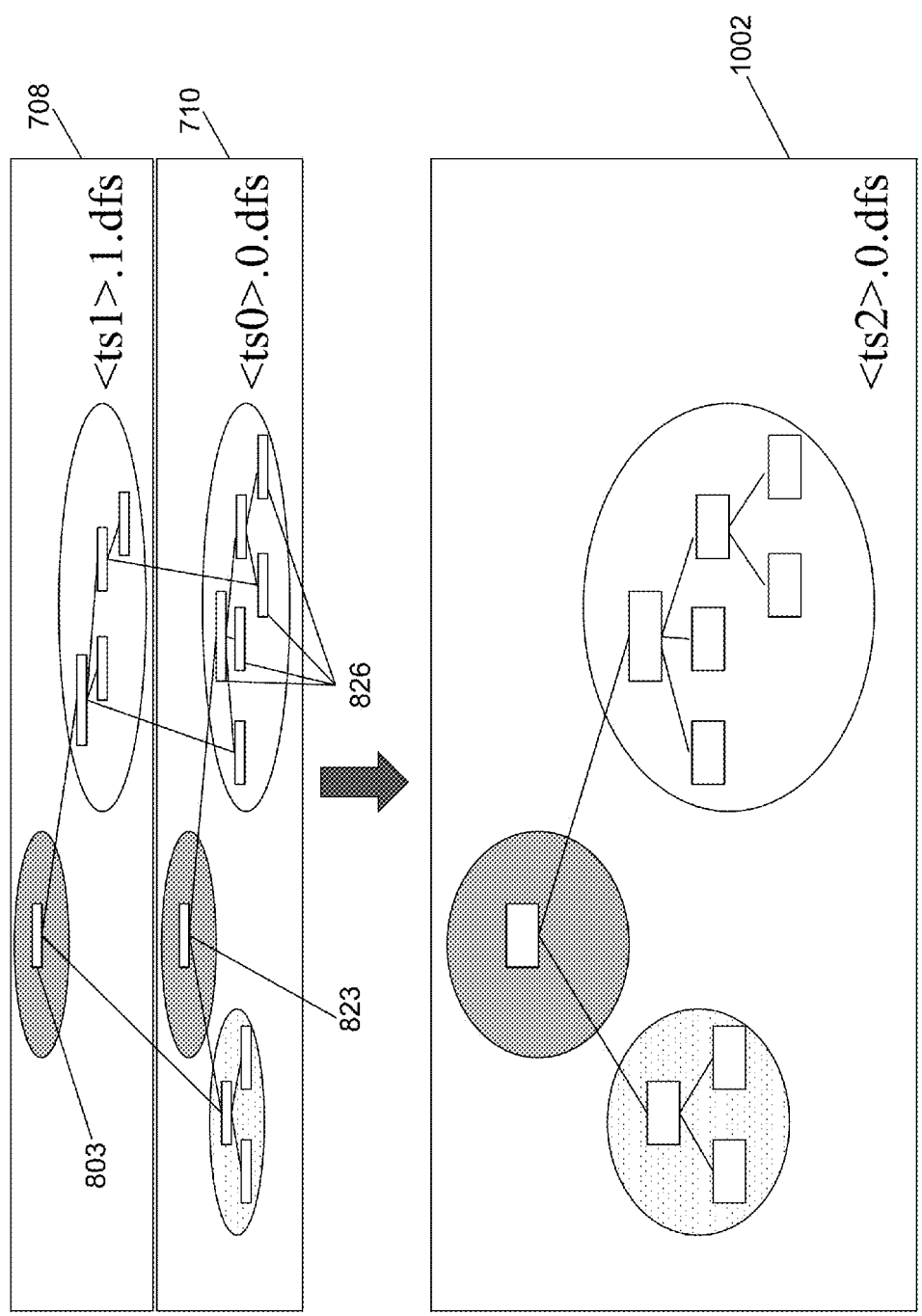
FIG. 10 is a block diagram of an example of a condense operation for large databases in accordance with certain embodiments of the present disclosure.

FIG. 10 is a block diagram of an example of a condense operation for large databases in accordance with certain embodiments of the present disclosure. Generation 0 database file <ts2>.0.dfs 1002 represents a newly condensed database file in accordance with method 900 (shown in FIG. 9). Database files <ts1>.1.dfs 708 and <ts0>.0.dfs 710 were condensed. In particular, all nodes referenced by new hive root 803 in database file <ts1>.1.dfs 708—and only those nodes—are copied into new database file 1002. For example, one result is that nodes 826 were discarded by the condense operation because they were not referenced or accessible by root 803, and were only referenced or accessible by root node 823. This discarding from the condense operation improves performance for versioned databases because the storage space used by nodes 826 and database files 708, 710 can be freed.

Figure 11:
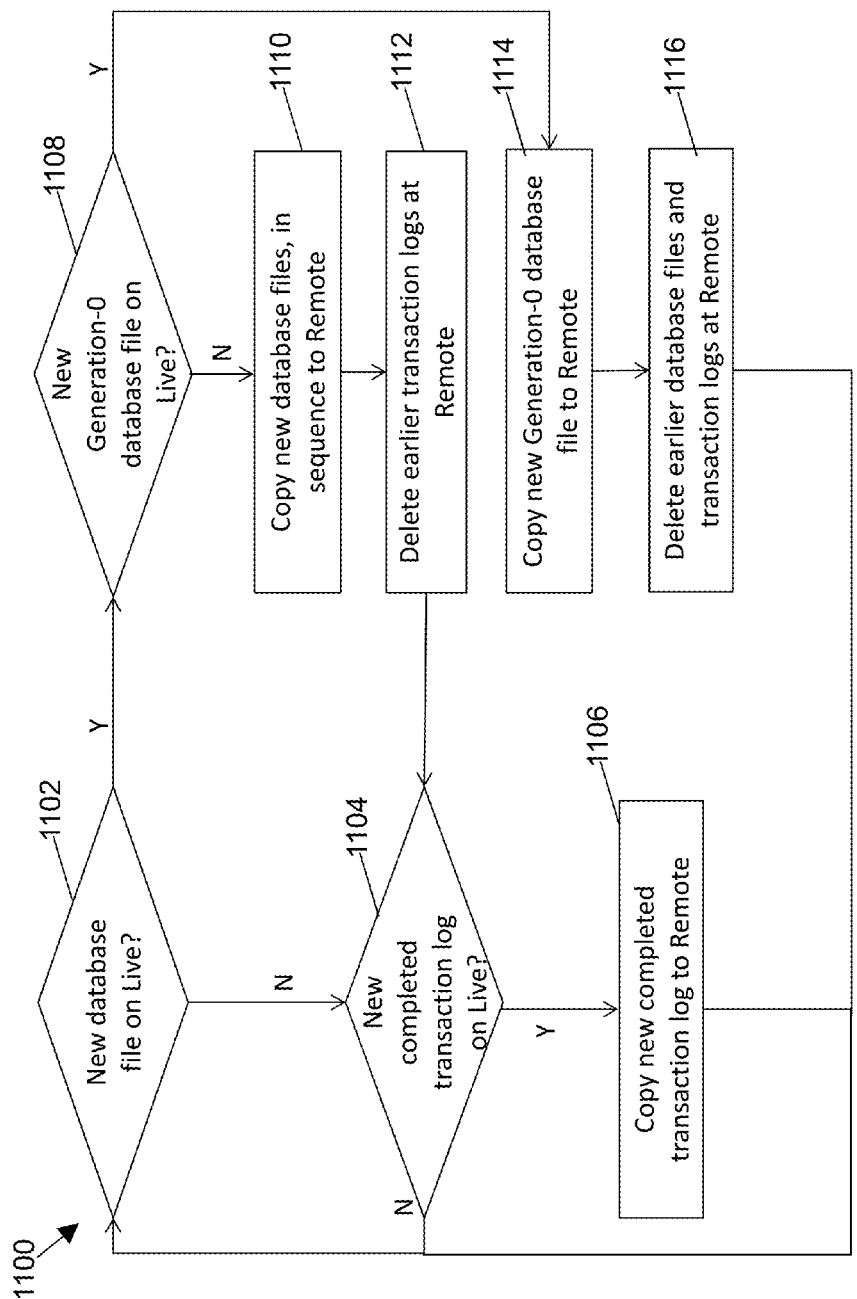
FIG. 11 illustrates an example of a method that the system performs for disaster recovery for large databases in accordance with certain embodiments of the present disclosure.

FIG. 11 illustrates an example of a method 1100 that the system performs for disaster recovery for large databases in accordance with certain embodiments of the present disclosure. To support disaster recovery, the present system copies relevant database files and transaction logs from a "Live" system to a system in a remote location, illustrated as "Remote." The "Live" system refers to the system actively servicing incoming requests such as create, read, update, and/or delete requests. As a result of method 1100, the "remote" system can be started up with the most recent data from the live system, in a situation where a disaster befalls the live system (e.g., extended power outage due to natural disaster, data loss).

Generally, the present system determines whether there are relevant files (i.e., database files and/or transaction logs) on the live system. If there are relevant files, the present system copies the relevant files to the remote system, and removes any unnecessary files on the remote system.

The present system checks whether there is a new database file on a live system (step 1102). If there is no new database file on the live system (step 1102: No), the present system determines whether there is a completed transaction log on the live system (step 1104). If there is no completed transaction log on the live system (step 1104: No), the present system completes the current loop and returns to determine whether there is a new database file on the live system (step 1102). If there is a new completed transaction log on the live system (step 1104: Yes), the present system copies all new completed transaction logs to the remote system (step 1106). The present system then completes the loop and returns to determine whether there is a database file on the live system (step 1102).

If there is a new database file on the live system (step 1102: Yes), the present system determines whether there is a new Generation-0 database file (i.e. a single-database-file hive from a condense operation (shown in FIGS. 9 and 10), which contains an entire versioned database) on the live system (step 1108). For example, the present system determines whether there is a new database file <ts>.0.dfs. If there is no new Generation-0 database file on the live system (step 1108: No), the present system copies all database files in sequence to the remote system (step 1110). For example, the present system can copy <ts0>.0.dfs, followed by <ts1>.1.dfs, followed by <ts2>.2.dfs, etc. The present system then deletes any earlier transaction logs on the remote system (step 1112). For example, the present system can delete xact.<ts2>.log, xact.<ts4>.log, etc. This is because the earlier transaction logs are incorporated into, and thus redundant with, the database files just copied. Finally, the present system completes the loop and returns to determine whether there is a new completed transaction log on the live system (step 1104).

If there is a new Generation-0 database file on the live system (step 1108: Yes), the present system copies the new Generation-0 database file to the remote system (step 1114). The present system deletes any earlier database files and transaction logs on the remote system (step 1116), since they are incorporated into the new Generation-0 database file just copied. Finally, the present system returns to determine whether there is a database file on the live system (step 1102).

Figure 12:
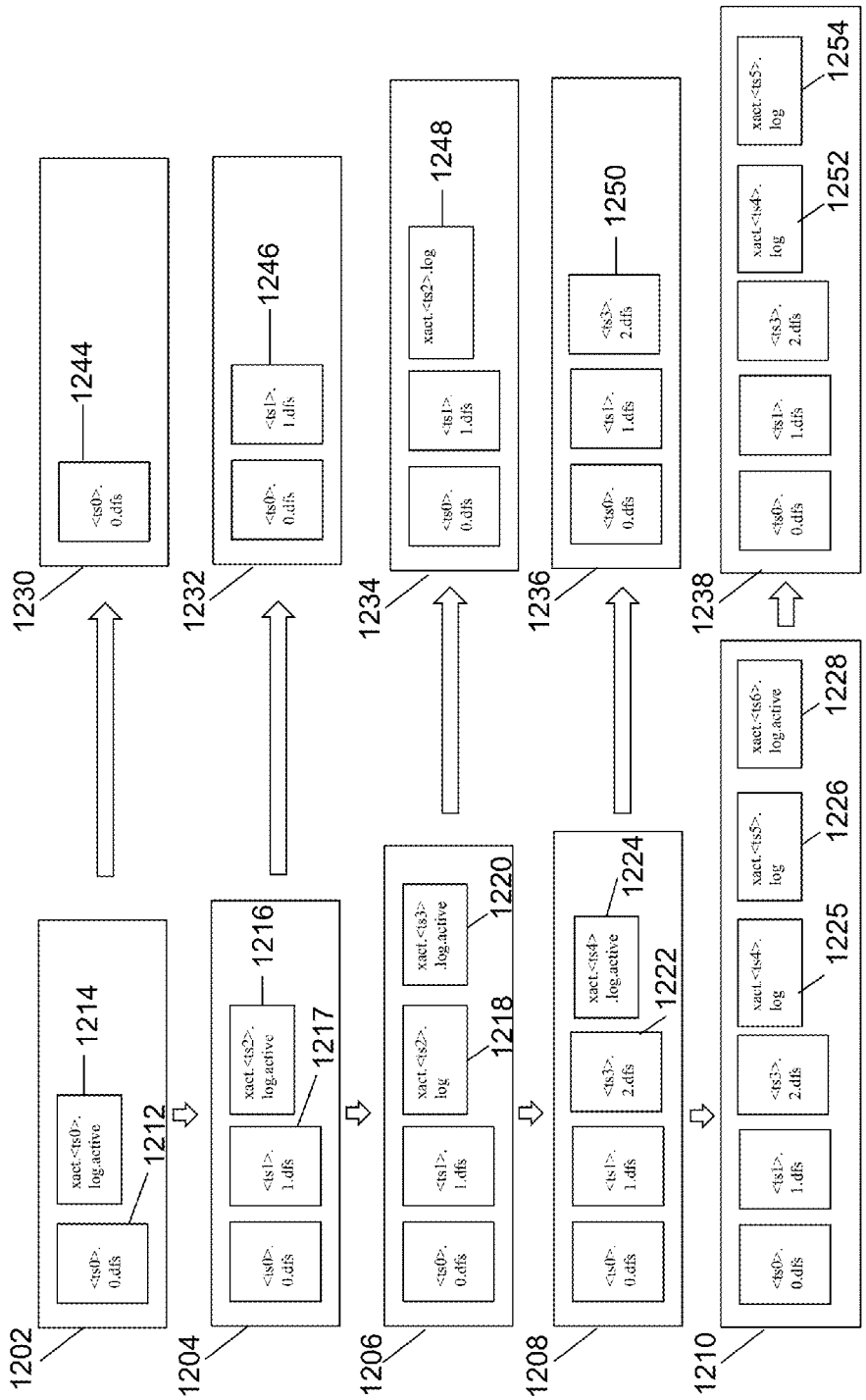
FIG. 12 is a block diagram of an example of disaster recovery for large databases in accordance with certain embodiments of the present disclosure.

FIG. 12 is a block diagram of an example of disaster recovery for large databases in accordance with certain embodiments of the present disclosure. In some embodiments, disaster recovery can be tuned to match contractual service level agreements (SLAs) by tuning a frequency of snapshot operations. As used herein, a snapshot operation describes closing the current transaction log and creating a new one. Example frequencies can include between five to fifteen minutes. Of course, the frequency of snapshot operations can range from minutes to hours.

Live states 1202-1210 (illustrated on the left side of FIG. 12) represent states of files that exist on the live system, as the live system changes over time. Remote states 1230-1238 (illustrated on the right side of FIG. 12) represent states of files that have been copied to the remote disaster recovery system, as files change over time on the live system.

Live state 1202 represents an initial starting point, after a condense operation has been performed. The condense operation resulted in database file <ts0>.0.dfs 1212. Upon completion of the condense operation, database file <ts0>.0.dfs 1212 is copied to the remote system, creating remote state 1230. Remote state 1230 includes new database file <ts>.0.dfs 1244. Accordingly, after the condense operation, database file <ts0>.0.dfs 1212 is preserved as a backup on the remote system.

Live state 1204 illustrates a result of a capture operation. The capture operation results in new database file <ts1>.1.dfs 1217 based on active transaction log xact.<ts0>.log.active 1214. The present system copies the new database file to the remote system, resulting in remote state 1232. Remote state 1232 includes new database file <ts1>.1.dfs 1246. Accordingly, after the capture operation, new database file <ts1>.1.dfs 1217 is preserved as a backup on the remote system.

Live state 1206 illustrates a result of a snapshot operation, which closes the current transaction log file and creates a new one. For example, as a result of a snapshot operation, live state 1204 which has active transaction log xact.<ts2>.log.active file 1216, morphs to live state 1206 where active transaction log xact.<ts2>.log.active file 1216 is closed to become complete transaction log xact.<ts2>.log file 1218, and a new active transaction log xact.<ts3>.log.active 1220 is created. In such an instance, when the transaction log is closed on the live system, the closed transaction log is copied to the remote system. For example, the present system creates remote state 1234. Remote state 1234 includes new closed transaction log xact.<ts2>.log file 1248, which is a copy of closed transaction log xact.<ts2>.log file 1218.

Live state 1208 illustrates a result of another capture operation. The capture operation results in new database file <ts3>.2.dfs 1222 based on transaction logs xact.<ts2>.log 1218 and xact.<ts3>.log.active 1220. In this regard, live state 1208 is similar to the disaster recovery from live state 1204 to remote state 1232, illustrated earlier. When new database file 1222 is complete, the present system copies the new database file to the remote system, resulting in remote state 1236. Remote state 1236 includes new database file <ts3>.2.dfs 1250, which is a copy of database file <ts3>.2.dfs 1222 from live state 1208.

Live state 1210 illustrates a result of two consecutive snapshot operations, without an intervening capture operation. The transition to remote state 1238 was done in multiple copy operations, separated by the time interval between snapshots in transaction log xact.<ts4>.log 1242 and transaction log xact.<ts5>.log 1226. The first copy operation copied transaction log xact.<ts4>.log 1225 to create transaction log xact.<ts4>.log 1252 in remote state 1238, and the second copy operation copied transaction log xact.<ts5>.log 1226 to create transaction log xact.<ts5>.log 1254 in remote state 1238.

Of course, although specific steps are disclosed in FIGS. 6, 9, and 11, such steps are exemplary. That is, the present system is well-suited to performing various other steps or variations of the steps recited in FIGS. 6, 9, and 11. The steps in FIGS. 6, 9, and 11 may be performed in an order different than presented, and that not all of the steps may be performed. FIGS. 6, 9, and 11 include processes that, in various embodiments, are carried out by a processor under the control of computer-readable and computer-executable instructions. Embodiments of the present disclosure may thus be stored as non-transitory computer-readable media or computer-executable instructions including, but not limited to, firmware updates, software update packages, or hardware (e.g., ROM).

Reference has been made in detail to various embodiments in accordance with the present disclosure, examples of which are illustrated in the accompanying drawings. While the invention has been described in conjunction with various embodiments, these various embodiments are not intended to limit the invention. On the contrary, the invention is intended to cover alternatives, modifications, and equivalents, which may be included within the scope of the invention as construed according to the appended claims. Furthermore, in the detailed description of various embodiments, numerous specific details have been set forth in order to provide a thorough understanding of the invention. However, the invention may be practiced without these specific details. In other instances, well known methods, procedures, components, and circuits have not been described in detail, so as not to unnecessarily obscure aspects of the invention.

Some portions of the detailed descriptions have been presented in terms of procedures, logic blocks, processing, and other symbolic representations of operations on data bits within a non-transitory computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of operations or steps or instructions leading to a desired result. The operations or steps are those utilizing physical manipulations and transformations of physical quantities. Usually, although not necessarily, these quantities take the form of electrical or magnetic signals capable of being stored, transferred, combined, compared, and otherwise manipulated in a computer system or computing device. It has been convenient at times, principally for reasons of common usage, to refer to these signals as records, transactions, bits, values, elements, symbols, characters, samples, pixels, or the like.

Of course, all of these and similar terms are to be associated with the appropriate physical quantities and are merely convenient labels applied to these quantities. Unless specifically stated otherwise as apparent from the foregoing discussions, it is appreciated that throughout the present disclosure, discussions utilizing terms such as "deactivating," "disabling," "re-activating," "enabling," "sending," "receiving," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the system memories, registers or other such information storage, transmission or display devices.

The present systems and methods can be implemented in a variety of architectures and configurations. For example, the present systems and methods can be implemented as part of a distributed computing environment, a cloud computing environment, a client server environment, etc. The embodiments described herein may be discussed in the general context of computer-executable instructions residing on some form of non-transitory computer-readable storage medium, such as program modules, executed by one or more computers, computing devices, or other devices. As described earlier, non-limiting examples of computer-readable storage media may include storage media and communication media. Generally, program modules include routines, programs, objects, components, data structures, etc., that perform particular tasks or implement particular abstract data types. The functionality of the program modules may be combined or distributed as desired in various embodiments.

The foregoing descriptions of specific embodiments of the present systems and methods have been presented for purposes of illustration and description. The specific embodiments are not intended to be exhaustive or to limit the invention to the precise forms disclosed, and many modifications and variations are possible in light of the above description. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method for improving performance of a versioned database, the method comprising:
closing a transaction log from receiving new transactions, the transaction log tracking a series of commands for updating a versioned database based at least in part on one or more earlier database files;
creating a new database file with a new database root tree node, the new database file configured to be append-only to avoid losing existing versioned database information, the new database root tree node replacing an old database root tree node for retrieving one or more records in the versioned database;
appending updated data in the new database file, the updated data determined based at least in part on one or more transactions in the transactions log;
updating the new database file to refer to the one or more earlier database files, based at least in part on the one or more transactions in the transactions log;
storing the transaction log, the new database file, and the one or more earlier database files on a live system, the live system servicing requests for database operations;
determining whether to copy at least one of the transaction log, the new database file, and the one or more earlier database files to a remote system, based at least in part on whether there is a new database file on the live system;
if there is a new database file on the live system,
  determining whether there is a new initial database file on the live system;
  if there is a new initial database file on the live system,
    copying the new initial database file to a remote system, and
    deleting the one or more earlier database files and earlier transaction logs on the remote system;
  otherwise,
    copying new database files in sequence to the remote system; and
    deleting earlier transaction logs on the remote system;
otherwise,
  determining whether there is a completed transaction log on the live system; and
  if there is a completed transaction log on the live system,
    copying the new completed transaction log to the remote system.

2. The method of claim 1, further comprising:
for a tree of nodes associated with the new database root tree node in the new database file, the tree of nodes representing records in the versioned database,
  determining which nodes in the tree of nodes are accessible from the new database root tree node, and
  copying to a temporary database file only the nodes which are determined to be accessible from the new database root tree node.

3. The method of claim 1, wherein at least one of the new database file and the one or more earlier database files stores at least one of a chain datastore, a table datastore, and a set datastore.

4. The method of claim 1, wherein
the new database file and the one or more earlier database files store trees of nodes, the trees of nodes representing records in the versioned database; and
the appending updated data further comprises creating new nodes to refer to new versions of corresponding data in the versioned database, the new nodes created in a tree of nodes corresponding to the new database file.

5. The method of claim 1, wherein
the new database file and the one or more earlier database files store trees of nodes, the trees of nodes representing records in the versioned database; and the updating the new database file further comprises modifying nodes in a tree of nodes corresponding to the new database file to refer back to the one or more earlier database files, when transactions tracked in the transaction logs do not modify records in a corresponding datastore of the tree of nodes.

6. The method of claim 2, wherein the tree is at least one of a B+ tree and a B tree.

7. A system for improving performance of a versioned database, the system comprising:
 a virtual memory;
 a disk; and
 at least one processor configured to
  create a new database file with a new database root tree node, the new database file configured to be append-only to avoid losing existing versioned database information, the new database root tree node replacing an old database root tree node for retrieving one or more records in the versioned database;
  append updated data in the new database file, the updated data determined based at least in part on one or more transactions in a transactions log;
  update the new database file to refer to the one or more earlier database files, based at least in part on the one or more transactions in the transactions log;
  store the transaction log, the new database file, and the one or more earlier database files on a live system, the live system servicing requests for database operations;
  determine whether to copy at least one of the transaction log, the new database file, and the one or more earlier database files to a remote system, based at least in part on whether there is a new database file on the live system;
  if there is a new database file on the live system,
   determine whether there is a new initial database file on the live system;
   if there is a new initial database file on the live system,
    copy the new initial database file to a remote system, and
    delete the one or more earlier database files and earlier transaction logs on the remote system;
   otherwise,
    copy new database files in sequence to the remote system; and
    delete earlier transaction logs on the remote system;
  otherwise,
   determine whether there is a completed transaction log on the live system; and
   if there is a completed transaction log on the live system,
    copy the new completed transaction log to the remote system.

8. The system of claim 7, wherein:
the at least one processor is configured to
 for a tree of nodes associated with the new database root tree node in the new database file, the tree of nodes representing records in the versioned database,
  determine which nodes in the tree of nodes are accessible from the new database root tree node, and
  copying to a temporary database file only the nodes which are determined to be accessible from the new database root tree node.

9. The system of claim 7, wherein at least one of the new database file and the one or more earlier database files stores at least one of a chain datastore, a table datastore, and a set datastore.

10. The system of claim 7, wherein
the new database file and the one or more earlier database files store trees of nodes, the trees of nodes representing records in the versioned database; and
the at least one processor configured to append the updated data is further configured to create new nodes to refer to new versions of corresponding data in the versioned database, the new nodes created in a tree of nodes corresponding to the new database file.

11. The system of claim 7, wherein
the new database file and the one or more earlier database files store trees of nodes, the trees of nodes representing records in the versioned database; and
the at least one processor configured to update the new database file is further configured to modify nodes in a tree of nodes corresponding to the new database file to refer back to the one or more earlier database files, when transactions tracked in the transaction logs do not modify records in a corresponding datastore of the tree of nodes.

12. The system of claim 8, wherein the tree is at least one of a B+ tree and a B tree.

* * * * *